Jan. 15, 1963  R. R. KING  3,073,283
BALANCE WEIGHT
Filed Oct. 3, 1960
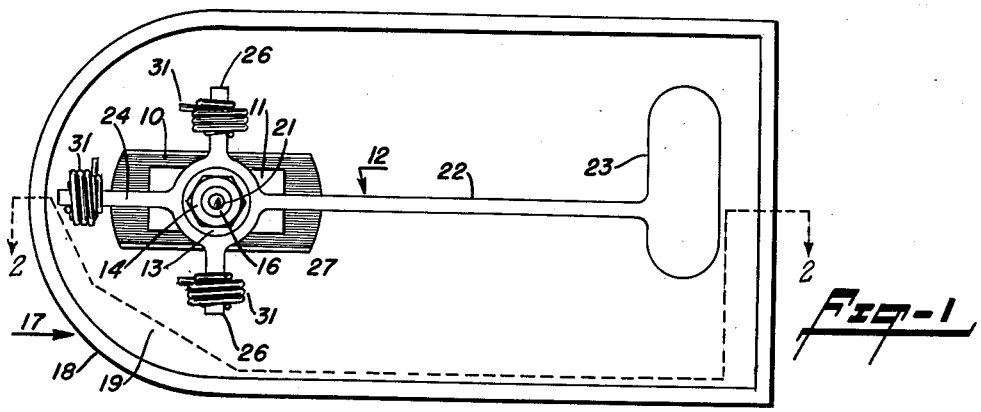
Fig-1
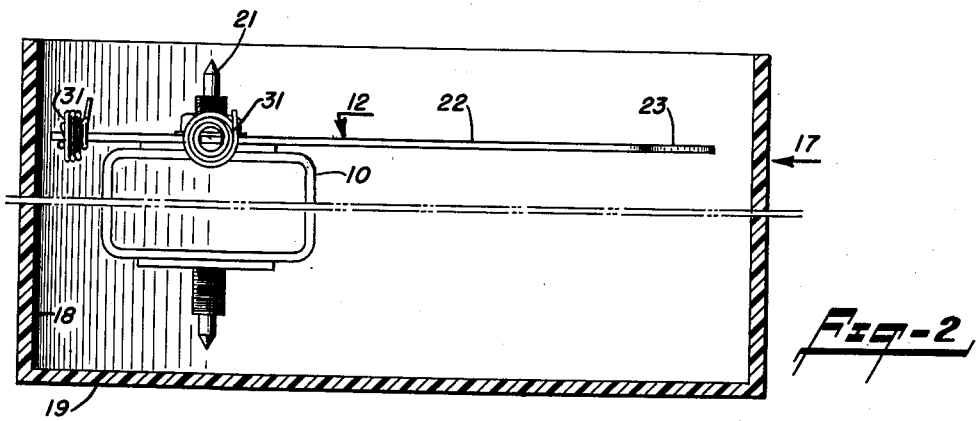
Fig-2
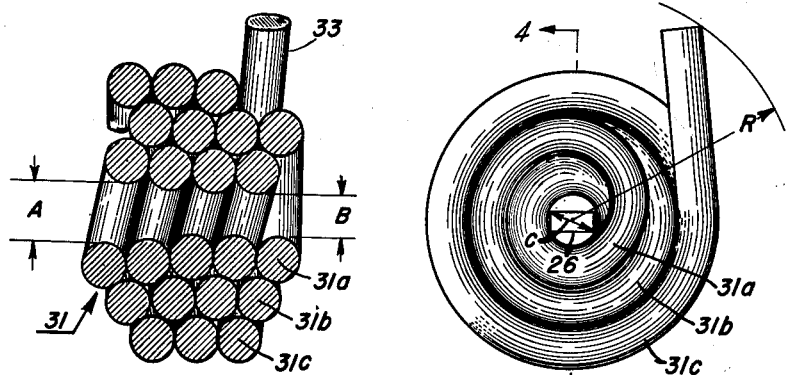
Fig-4
Fig-3
ROBERT R. KING
INVENTOR.
BY Rudolph J. Lurich
ATTORNEY United States Patent Office 3,073,283
Patented Jan. 15, 1963

3,073,283
BALANCE WEIGHT
Robert R. King, Maplewood, N.J., assignor, by mesne assignments, to Daystrom, Incorporated, Murray Hill, N.J., a corporation of Texas
Filed Oct. 3, 1960, Ser. No. 59,911
2 Claims. (Cl. 116—136.5)

This invention relates to an electrical instrument and more particularly to a novel multiple layer wire wound balance weight for balancing the movable mechanism of the instrument.

Many electrical instruments include a pivotably mounted or moving system having an elongated pointer or flag mechanism associated therewith. In order to statically balance the moving system, the pointer or flag mechanism includes a tail member extending in a direction opposite the indicating or flag carrying arm, and a pair of cross arms extending outwardly from the pivot axis of the system. Since it is often impractical to make the tail and cross arms of sufficient length and size to balance the moving system, balance weights are often carried by the same, which weights are adjustably positioned therealong to provide the proper balance. Heretofore, such balance weights have generally comprised either solid members secured as by threading, or any other suitable means to the pointer, or single layer helical wire wound weights which are rotated onto the pointer. Disadvantages of such prior art arrangements include the relatively high cost of solid balance nuts and the fact that single layer helical wire wound weights must be relatively long, or mounted on relatively long arm portions of the pointer in order to balance a massive pointer or flag mechanism.

In accordance with this invention, the above-mentioned disadvantages of known balance weights are eliminated by a balance weight comprising a wire wound in the order of a plurality of coaxial balances. In addition to being easily wound, such balance weights are easily applied to the pointer mechanism and are easily adjusted thereon to provide the proper balance. They are particularly adapted for use in confined spaces where a minimum amount of room is provided for the balancing arrangement of the instrument mechanism.

An object of this invention is the provision of a wire wound balance weight for use on the moving system of an instrument, the axial length of such weight being small in relation to the weight of the said balance weight.

An object of this invention is the provision of a multiple layer wire wound balance weight which is particularly useful in instruments having a moving mechanism confined to a small space.

An object of this invention is the provision of a one-piece balance weight comprising a length of wire generally wound in the form of a plurality of coaxial helices.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

FIGURE 1 is a top plan view of an instrument moving system employing balance weights embodying this invention;

FIGURE 2 is a sectioned side elevational view of the instrument shown in FIGURE 1 taken along the lines 2—2, with the case shown broken away for clarity;

FIGURE 3 is an enlarged end view of a balance weight secured to a pointer mechanism; and FIGURE 4 is an enlarged cross-sectional view taken along the lines 4—4 of a balance weight removed from the instrument.

The balance weights of this invention are not limited to use on any particular type of instrument mechanism, but may be employed in any movable system for the balance thereof. By way of example only, the weights may be used on electrical instruments of the moving iron vane, electrodynamometer, permanent magnet moving coil type, or the like. Referring, now, to FIGURES 1 and 2, there is shown a wire-wound movable coil 10, an upper pivot base 11 secured to the coil as by cementing, or any other suitable means, a pointer 12, a compression washer 13 and a nut 14 threaded to an externally threaded cylindrical portion 16 of the pivot base thereby securing the said pointer to the coil. The instrument mechanism may be mounted, by any suiatble means not shown, within a case 17 comprising side walls 18 extending upwardly from a base portion 19, shown in FIGURE 1. The threaded cylindrical portion 16 of the pivot base is provided with an axial bore for accommodation of a pointed pivot 21 rotatable in a suitable bearing not shown. The lower end of the coil is shown provided with a similar pointed pivot and pivot base arrangement; it being understood that the coil and attached members are pivotable about the axis of the pivots.

The pointer 12 shown illustrated as a balance cross is of substantially conventional structure and is made of flat stock formed to provide a relatively long flag carrying pointer arm 22 at the free end of which a flag 23 is shown formed. A tail piece 24 extends diametrically opposite the flag arm 22, and cross arms 26 extend outwardly from the hub portion 27 of the pointer. Novel adjustable weights 31, made in accordance with my invention, are carried on the cross arms and tail for balancing the movable mechanism.

In order to illustrate one advantage derived from the use of balance weights of my invention, I have shown the mechanism positioned in a case in which there is only a relatively small clearance between the ends of the tail and cross arms and the inside wall of the case whereby the length of such tail and cross arms is limited. If conventional single layer helical balance weights are not sufficiently heavy to provide a balanced movement, it has been heretofore necessary to resort to solid balance nuts which are relatively expensive. With my invention, multiple layer wire wound balance weights may be made sufficiently heavy to function in the illustrated arrangement where space is at a minimum. Referring, now, also to FIGURES 3 and 4, the illustrated balance weight comprises a single piece of resilient wire formed into helical concentric coils; the inner (first), center (second), and outer (third) coils being designated 31a, 31b and 31c, respectively. The convolutions of the inner coil 31a are wound in side by side abutting relationship, while those of the center and outer coils are also wound in side by side abutting relationship to the extent permitted by the layered construction. In the manufacture of the balance weight, the inner coil is wound from left to right, as viewed in FIGURE 4, and in a clockwise direction as viewed from the left side of FIGURE 4. From the end convolution to the right, in FIGURE 4, the wire is spiraled radially outwardly and the second layer 31 is wound over the inner layer, with the winding of coils in the same circular direction. If two layers do not provide sufficient weight, a third layer is included, as illustrated. It will be noted that each succeeding outer layer is provided with substantially one less convolution than the adjacent smaller diameter layer whereby the coils will not come apart under conditions of shock and/or vibration.

It will be noted that the axial opening through the inner coil 31a is of greater diameter at one end than the other end. That is, the diameter A, in FIGURE 4, at one end is greater than the diameter B at the other end. If desired, the axial passage through the inner coil 31a may become increasingly smaller in diameter from the one end to the other or, as illustrated, a plurality of convolutions adjacent the one end may be of uniform large diameter while a plurality of convolutions at the other end are of a uniform smaller diameter; the convolutions between the large and small diameter ends becoming progressively smaller in diameter going toward the smaller diameter end.

As best seen in FIGURE 3, the balance cross 12 is of a rectangular-shaped cross section having a diagonal dimension C. It will be understood that the large diameter dimension A of the balance weight (FIGURE 4) is slightly greater than the cross arm diagonal dimension C whereby the large diameter end of the said weight defines a receiving mouth for the end of the balance cross. With this construction, the weight is easily aligned on the balance cross when first slipped thereover. The small inside diameter dimension B of the balance weight is smaller than the diagonal dimension C of the balance cross. Hence, after sliding the weight over the end of the balance cross to the point that the convolutions decrease in size to engage the said cross arm, the weight is applied by simultaneous inward and rotary movement thereto in a clockwise direction, as viewed in FIGURE 3. To aid in the rotation of the weight, a handle end 33 is provided thereon having a sufficient radial dimension R to permit engagement with a suitable wrench of a type well known. As clockwise rotation of the handle end 33, as viewed in FIGURE 3, is effected, the balance weight is screwed onto the cross arm. During this process, threads are formed on the corners of the cross arm since the small convolutions of the weight are of a smaller diameter than the diagonal dimension of the cross arm. Further, clockwise rotation of the handle end 33 tends to unwind the coiled weight thereby enlarging the convolutions thereof to enable the same to surround the cross arm. When this rotary unwinding force is terminated, the convolutions tend to return to their normal unextended diameters whereby a clamping force is exerted thereby on the cross arm. Since threads are formed on the cross arm by the weight, the weight is easily adjusted longitudinally of the said cross arm whereby a proper balance of the moving system of the instrument may be made.

The requirements of a high mass balance weight on a minimum length cross arm may be met by the illustrated multiple layer winding. Further, by employing high density wire, such as tantalum, tungsten, or the like, a maximum weight of smallest possible dimension is obtainable.

Having now described this invention in detail, various changes and modifications will suggest themselves to those skilled in this art. It is intended that such changes and modifications may be made without departing from the spirit and scope of the invention as set forth in the following claims.

I claim:
1. A balance weight for application to an arm of generally rectangular-shaped cross section included in a balance cross arrangement for an electrical instrument comprising:
   first and second coaxial and concentric helical coils,
   the convolutions of each said coils being wound in side by side abutting relationship from a unitary resilient wire,
   the axial opening through the first coil being of greater diameter at one end than at the other end with the greater diameter dimension being greater than the diagonal dimension of the cross section of the balance cross arm and the smaller diameter dimension being less than the said diagonal dimension,
   said second coil overlying said first coil whereby said balance weight occupies a relatively small portion of the surface area of the balance cross arm.
2. The invention set forth in claim 1 wherein the number of convolutions in said second coil is less than the number of convolutions in said first coil.

References Cited in the file of this patent
UNITED STATES PATENTS

| | | |
|---|---|---|
| 1,579,849 | Weston | Apr. 6, 1926 |
| 2,410,288 | Johnson | Oct. 29, 1946 |
| 2,626,296 | Side | Jan. 20, 1953 |